(12) United States Patent
Kim et al.

(10) Patent No.: US 12,031,681 B2
(45) Date of Patent: Jul. 9, 2024

(54) KNOB CAP FOR HIGH-PRESSURE TANK

(71) Applicant: LOTTE CHEMICAL CORPORATION, Seoul (KR)

(72) Inventors: Dae Gun Kim, Daejeon (KR); Kyo Min Lee, Daejeon (KR); Young Koan Ko, Daejeon (KR); You Jung Lee, Daejeon (KR); Won Young Kim, Daejeon (KR)

(73) Assignee: Lotte Chemical Corporation, Seoul (KR)

( * ) Notice: Subject to any disclaimer, the term of this patent is extended or adjusted under 35 U.S.C. 154(b) by 154 days.

(21) Appl. No.: 17/777,710

(22) PCT Filed: Nov. 18, 2020

(86) PCT No.: PCT/KR2020/016248
§ 371 (c)(1),
(2) Date: May 18, 2022

(87) PCT Pub. No.: WO2021/101239
PCT Pub. Date: May 27, 2021

(65) Prior Publication Data
US 2023/0003347 A1  Jan. 5, 2023

(30) Foreign Application Priority Data

Nov. 19, 2019 (KR) .................. 10-2019-0148484

(51) Int. Cl.
*F17C 13/06* (2006.01)
(52) U.S. Cl.
CPC ...... *F17C 13/06* (2013.01); *F17C 2203/0604* (2013.01); *F17C 2203/0646* (2013.01);
(Continued)

(58) Field of Classification Search
CPC ............ F17C 13/06; F17C 2205/0308; F17C 2205/0311; F17C 2209/2154;
(Continued)

(56) References Cited

U.S. PATENT DOCUMENTS 6,089,399 A * 7/2000 Felbaum ............... B32B 15/013
220/582
6,135,308 A 10/2000 Fang
(Continued)

FOREIGN PATENT DOCUMENTS

EP  1029195 B1  8/2000
JP  07-158797 A  6/1995
(Continued)

OTHER PUBLICATIONS

International Search Report in counterpart International Applicaton No. PCT/KR2020/016248 dated Feb. 24, 2021, pp. 1-3.
(Continued)

*Primary Examiner* — Robert J Hicks
(74) *Attorney, Agent, or Firm* — Additon, Pendleton & Witherspoon, P.A.

(57) ABSTRACT

The present invention relates to a knob cap for a high-pressure tank including a coupling groove portion corresponding to a knob of a liner of the high-pressure tank formed in a lower surface of a body; a peripheral wing portion extending outward in a lower end of an outer circumferential surface of the body to be in contact with a surface of the liner; and a thickness conversion portion formed in the outer circumferential surface of the body to change a thickness between a center line and the outer circumferential surface.

9 Claims, 6 Drawing Sheets

(52) U.S. Cl.
CPC ............. *F17C 2203/0663* (2013.01); *F17C 2205/0308* (2013.01); *F17C 2209/2154* (2013.01); *F17C 2221/012* (2013.01); *F17C 2221/033* (2013.01); *F17C 2221/035* (2013.01); *F17C 2223/035* (2013.01); *F17C 2270/0184* (2013.01)

(58) Field of Classification Search
CPC ........ F17C 2223/035; F17C 2203/0663; F17C 2203/0665; F17C 2203/067; F17C 2203/0604; F17C 2203/0646
USPC .......... 220/582, 581, 203.01, 202, 200, 590, 220/589, 588, 586; 206/0.6
See application file for complete search history.

(56) References Cited

U.S. PATENT DOCUMENTS

| | | | |
|---|---|---|---|
| 6,230,922 | B1 | 5/2001 | Rasche et al. |
| 8,096,441 | B2* | 1/2012 | Sato .................... F17C 1/06 220/582 |
| 8,297,468 | B1* | 10/2012 | DeLay .................. F17C 1/06 220/586 |
| 8,640,910 | B2 | 2/2014 | Novak et al. |
| 2010/0294776 | A1 | 11/2010 | Liu |
| 2011/0210516 | A1* | 9/2011 | Sharp ................ F17C 1/16 277/630 |
| 2016/0025266 | A1 | 1/2016 | Levitt et al. |
| 2016/0053945 | A1 | 2/2016 | Leavitt |
| 2016/0348845 | A1 | 12/2016 | Bowman et al. |
| 2017/0276294 | A1* | 9/2017 | Almagro ............. F17C 1/06 |
| 2018/0073683 | A1 | 3/2018 | Takemoto |
| 2018/0172208 | A1* | 6/2018 | Lee ................... F17C 13/00 |
| 2020/0088299 | A1 | 3/2020 | Baumer et al. |

FOREIGN PATENT DOCUMENTS

| | | |
|---|---|---|
| JP | 08-219391 A | 8/1996 |
| JP | 10-332082 A | 12/1998 |
| JP | 11-044399 A | 2/1999 |
| JP | 2001-524653 A | 12/2001 |
| JP | 2017-129153 A | 7/2017 |
| JP | 6432673 B2 | 12/2018 |
| KR | 10-2019-0116409 A | 10/2019 |
| WO | 2021/101239 A1 | 5/2021 |

OTHER PUBLICATIONS

Extended Search Report in counterpart European Application No. 20889313.1 dated Oct. 30, 2023, pp. 1-7.

* cited by examiner

KNOB CAP FOR HIGH-PRESSURE TANK

CROSS-REFERENCE TO RELATED APPLICATIONS

This application claims priority to and the benefit of International Application No. PCT/KR2020/016248, filed Nov. 18, 2020, which published as WO 2021/101239 on May 27, 2021, and Korean Patent Application No. 10-2019-0148484, filed in the Korean Intellectual Property Office on Nov. 19, 2019, the entire disclosure of each of which is incorporated herein by reference.

TECHNICAL FIELD

The present invention relates to a knob cap for a high-pressure tank, and relates to a knob cap for a high-pressure tank, which becomes a coupling part with a shaft when the high-pressure tank is manufactured by winding a composite material fiber on a surface of a liner by a filament winding technique.

BACKGROUND ART

A high-pressure tank storing high pressure gas such as hydrogen is installed in a vehicle using a gaseous fuel such as a natural gas vehicle or a hydrogen fuel cell vehicle. In particular, as a high-pressure tank storing high pressure hydrogen gas, a high-pressure tank corresponding to type 4 is used.

In general, the high-pressure tank of type 4 is manufactured by forming a composite material layer on a surface of a liner made of a plastic material by a filament winding technique. The liner is manufactured by combining a metal boss and a knob to a plastic material such as polyolefin-based resin or polyamide-based resin. The composite material layer is formed by winding a composite fiber in which a carbon fiber or a glass fiber is mixed with a polymer resin such as an epoxy resin on the surface of the liner.

In the case of a high-pressure tank of a one port type, a port that is a head boss to which a valve for an entry of gas such as hydrogen is coupled is formed on one side, and a knob that is a tail boss for the purpose of fixing the tank is formed on the other side. A method in which a metallic knob cap is externally coupled to the knob has been conventionally used.

The knob cap serves to be coupled to a fixing shaft and fix the tank in order to prevent the tank from shaking during a filament winding process. Since the entire knob cap is made of metal, the knob cap became a factor hindering a weight reduction of the high-pressure tank.

PRIOR TECHNICAL DOCUMENT

Patent Document (Patent Document 1) Japanese Patent Laid-Open Publication No. 1998-332082 (Dec. 15, 1998)

DISCLOSURE

Technical Problem

The present invention has been made in an effort to provide a knob cap for a high-pressure tank having advantages of enabling a weight reduction and securing a structural stability.

An exemplary embodiment of the present invention provides a knob cap for a high-pressure tank having advantages of installing a reinforcing cap having impact resistance so as to improve a protective effect against an external impact.

Technical Solution

Another embodiment of the present invention provides a knob cap for a high-pressure tank including a coupling groove portion corresponding to a knob of a liner of the high-pressure tank formed in a lower surface of a body; a peripheral wing portion extending outward in a lower end of an outer circumferential surface of the body to be in contact with a surface of the liner; and a thickness conversion portion formed in the outer circumferential surface of the body to change a thickness between a center line and the outer circumferential surface.

According to the present invention, a metal insert formed of a metal material coupled to the knob may be inserted into the coupling groove portion of the body.

According to the present invention, the metal insert may be formed in the shape of a cup having a hollow in which a thread is formed on an inner circumferential surface.

According to the present invention, one or more inner grooves extending downward from an upper surface of the body may be formed in the body.

According to the present invention, a reinforcing cap including a coupling protrusion coupled to the inner groove and in a shape of a disc with a hollow may be coupled to the upper surface of the body.

According to the present invention, the metal material of the metal insert may include aluminum, and the body may be formed of fiber-reinforced plastic reinforced with a glass fiber or a carbon fiber.

According to the present invention, the thickness conversion portion may be in the form of stairs in which a step is formed.

According to the present invention, in the thickness conversion portion, the outer circumferential surface may be in the form of an inclined surface in which a thickness of the body decreases toward an upper side, or in the form of a curved groove or a V-shaped groove concave toward a center line.

According to the present invention, in a center of the upper surface of the body, a hollow fixing groove to which a fixing shaft is able to be coupled when performing a filament winding process may be formed. A metal bushing may be coupled to the fixing groove.

Advantageous Effects

According to the knob cap for the high-pressure tank according to the present invention having the configuration as described above, it is possible to form the knob cap of a plastic material such as fiber-reinforced plastic, thereby increasing the effect of a weight reduction of the high-pressure tank.

According to the present invention, it is possible to control a generation of strong internal stress in the high-pressure tank by forming the thickness conversion portion in the form of stairs on the outer circumferential surface of the knob cap, thereby preventing damage to the knob cap and the high-pressure tank.

According to the present invention, it is possible to install the reinforcing cap having an impact resistance outside the knob cap, thereby protecting the knob cap from a drop test and an external impact.

MODE FOR INVENTION

Figure 1:
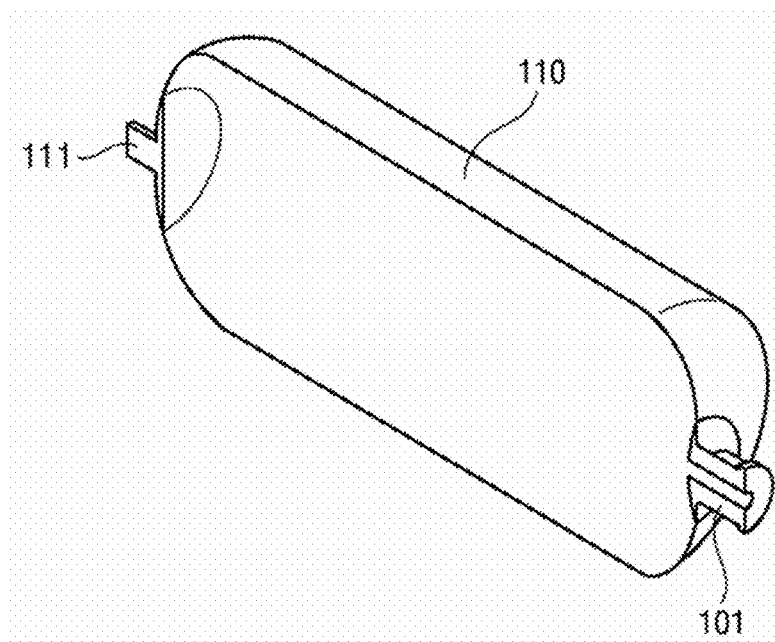
FIG. 1 is a diagram of a configuration of a liner to which a knob cap for a high-pressure tank is coupled according to the present invention.

Since the present invention may have various changes and may have various forms, embodiments will be described in detail in the detailed description. However, this is not intended to limit the present invention to the specific form of disclosure, it should be understood to include all modifications, equivalents and substitutes included in the spirit and scope of the present invention. In describing each of the drawings, like reference numerals have been used for like elements.

The above terms are used only for the purpose of distinguishing one element from another element. The terms used in the present application are only used to describe specific embodiments, and are not intended to limit the present invention. The singular expression includes the plural expression unless the context clearly dictates otherwise.

Hereinafter, an embodiment of the present invention will be described in detail with reference to the accompanying drawings.

FIG. 1 is a diagram of a configuration of a liner of a high-pressure tank according to the present invention.

The high-pressure tank storing high-pressure gas such as hydrogen includes a liner 110 and a composite material layer formed by winding a fiber-reinforced composite material on an outer surface of the liner by a filament winding technique. The liner 110 stores high-pressure gas in an internal space and maintains tightness of the gas, and the composite material layer serves to support a stress acting in a circumferential direction of the liner due to an internal pressure of the gas.

The liner 110 uses a plastic material such as polyolefin-based resin or polyamide-based resin for a weight reduction, and is manufactured through blow molding, rotational molding, or injection molding.

A composite material layer 120 (see FIG. 3) is formed by wrapping a fiber-reinforced composite material in which a carbon fiber or a glass fiber is mixed with a polymer resin such as an epoxy resin on the surface of the liner 110, to maintain strength.

The high-pressure tank 100 manufactured as described above is used for compressing and storing various fluids including liquefied petroleum gas (LPG), compressed natural gas (CNG), light hydrocarbons (methane, propane, and butane) and hydrogen gas.

A valve is coupled to one side of the liner 110 and a port 101 through which a gaseous fuel may enter and exit is formed therein, and a knob 111 for the purpose of fixing is provided on the other side. A knob cap 200 as shown in FIGS. 2 and 3 is coupled to the knob 111.

Figure 2:
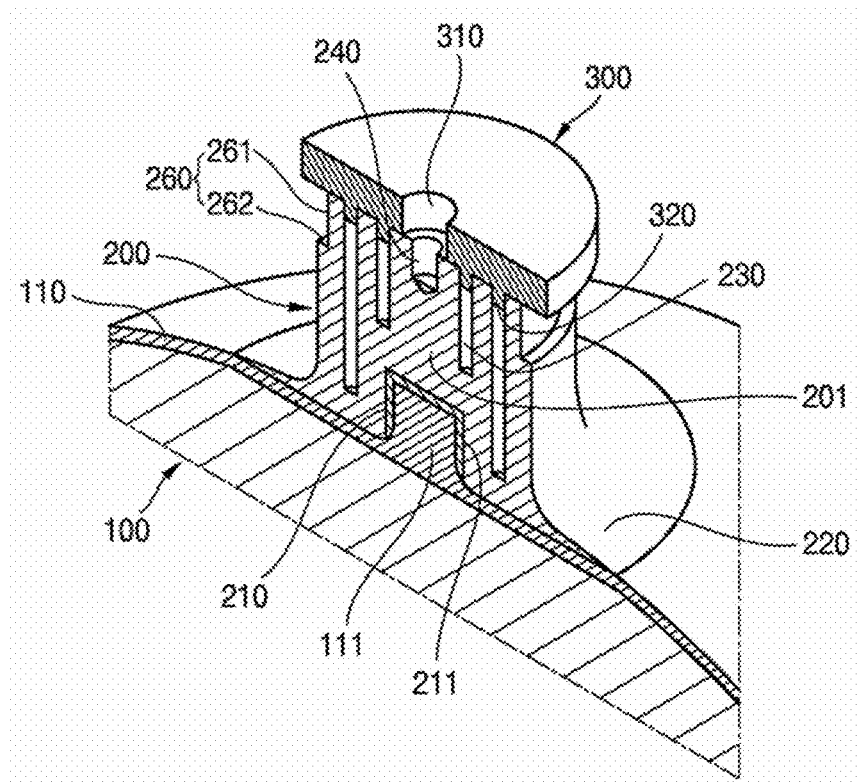
FIG. 2 is a perspective view illustrating a knob cap for a high-pressure tank according to an embodiment of the present invention.
Figure 3:
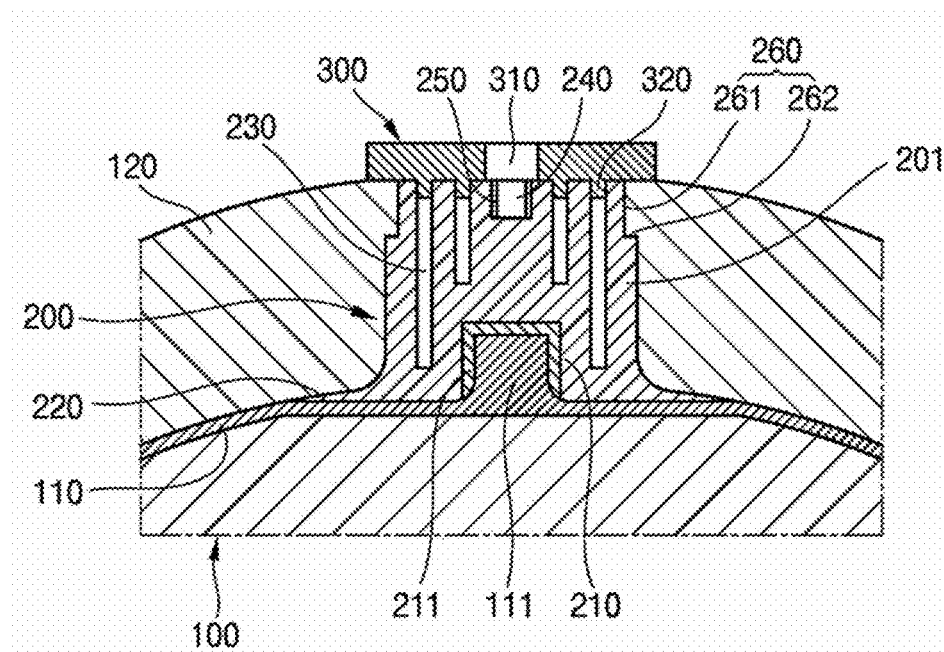
FIG. 3 is a cross-sectional view illustrating a knob cap for a high-pressure tank according to an embodiment of the present invention.

FIGS. 2 and 3 are respectively a perspective view and a cross-sectional view illustrating a knob cap for a high-pressure tank according to an embodiment of the present invention. For better understanding and ease of description, the composite material layer 120 is not shown in FIG. 2, but shown in FIG. 3.

The knob cap 200 according to an embodiment of the present invention includes a body 201 coupled to the knob 111 of the liner 110 of the high-pressure tank 100. According to an embodiment of the present invention, the body 201 may be formed of a plastic material, and may further include a metal insert 211 made of a metal material.

According to an embodiment of the present invention, as the plastic material of the knob cap body 201, fiber-reinforced plastic containing a fiber in a plastic resin is used. As the plastic resin, a polyolefin-based resin (HDPE series) or polyamide series (PA6, PA66, etc.) and a compound material based thereon or a combination of the above resin may be used, and a carbon fiber or a glass fiber in the form of a long fiber or a short fiber may be used as the fiber. The fiber-reinforced plastic according to the present invention may be long fiber thermoplastic (LFT) or short fiber thermoplastic (SFT). When the fiber-reinforced plastic is applied, it is advantageous that a weight specific gravity of the fiber is composed of 2% and 70%.

According to the knob cap 200 according to the present invention, the metal insert 211 made of a metal, for example, aluminum (Al), may be provided to a part to which the knob 111 of the liner 110 of the high-pressure tank is coupled. The body 201 is formed of a plastic material and is coupled to the metal insert 211, thereby improving a durability of the part to which the knob 111 of the liner 110 is coupled along with a weight reduction. When the knob cap 200 according to an embodiment of the present invention includes the metal insert 211, the knob cap 200 may be manufactured by an insert injection molding method in which the metal insert 211 is inserted into a mold and a plastic material is injected.

Referring to FIGS. 2 and 3, in the knob cap 200 according to an embodiment of the present invention, a coupling groove 210 is formed in the center of a lower surface of the body 201 in correspondence to the knob 111, and the metal insert 211 is provided to the coupling groove 210.

The metal insert 211 is a part to which the knob 111 of the liner 110 is inserted and coupled, and may be formed in the form of a hollow cup in which a thread is formed on an inner circumferential surface. Therefore, the metal insert 211 may be coupled with the knob 111 of the liner 110 in which a thread is formed on an outer circumferential surface, in a screw fastening manner. Since the metal insert 211 is integrally molded with the body 201, the knob cap 200 may be coupled to the knob 111 of the liner 110 in a screw fastening manner. The metal insert 211 increases the durability of the knob cap 200.

The body 201 of the knob cap 200 includes a peripheral wing portion 220 extending outward from a lower end of the outer circumferential surface. The peripheral wing portion 220 extends by continuing in a curve with the outer circumferential surface of the body 201 and an outer surface of the liner 110, and the entire bottom surface is closely attached to the liner 110.

A plurality of inner grooves 230 are formed in the body 201 of the knob cap 200. The inner groove 230 is a groove in the shape of a column that extends downward from an upper surface of the body 201, that is, the upper end opened and extending downward. The inner groove 230 may be formed in the form of a circular column or a polygonal column. The plurality of inner grooves 230 surround a center line of the body 201 and are arranged in an annular shape, are spaced at equal intervals in a circumferential direction, and arranged to be spaced in a radial direction.

The inner groove 230 functions to prevent shrinkage from occurring when demolded from a mold after injection molding. That is, when the knob cap is demolded from the mold after molding, shape deformation may occur as an amount of cooling shrinkage in the central portion is relatively increased, and a plurality of inner grooves 230 function to prevent the shape deformation due to the shrinkage.

According to the present invention, a reinforcing material may be mounted on the inner groove 230. That is, when there is concern about deterioration in physical properties due to the inner groove 230, the reinforcing material having a shape, for example, a cylindrical shape, corresponding to the inner groove 230, may be inserted into the inner groove 230 to prevent deterioration in physical properties.

According to the present invention, in the center of the upper surface of the body 201 of the knob cap 200, a fixing groove 240 in the form of a hollow for fixing a fixing shaft (not shown) required for a filament winding process is formed. In the fixing groove 240, a metal bushing 250 is installed inside to increase a bonding force with the fixing shaft.

The metal bushing 250 applied to the fixing groove 240 serves to strengthen the bonding force with the fixing shaft and to prevent damage due to strong tension during a filament winding operation.

According to an embodiment of the present invention, a thickness conversion portion 260 is formed on the outer circumferential surface of the body 201 of the knob cap 200.

The thickness conversion portion 260 changes a thickness of the body defined between the center line and the outer circumferential surface so that the outer circumferential surface has a different thickness at least in part in a height direction. The center line is a line passing through the center of the knob cap in the height direction. The thickness conversion portion 260 improves a bearing capacity with respect to an internal stress.

According to an embodiment of the present invention, as shown in FIGS. 2 and 3, the thickness conversion portion 260 formed on the outer circumferential surface of the body 201 of the knob cap 200 may be in the shape of stairs in which a step 262 is formed. Since the thickness conversion portion 260 has the step 262, the thickness conversion portion 260 has a reduction outer diameter portion 261 with a relatively reduced thickness on an upper end of the outer circumferential surface.

FIGS. 2 and 3 illustrate that one step is formed, but the thickness may be reduced in such a way that steps are continuously formed.

The thickness conversion portion 260 formed on the outer circumferential surface of the knob cap 200 allows the composite material layer 120 to be reinforced when the high-pressure tank is manufactured. Since the composite material layer 120 is reinforced to make it possible to support the stress, the thickness conversion portion 260 functions to improve the structural stability of the knob cap 200.

According to an embodiment of the present invention, the thickness conversion portion 260 is not limited to the shape of stairs and may be formed in various shapes.

FIG. 4 is a partial cross-sectional view for explaining implementation examples of the thickness conversion portion formed on an outer circumferential surface of the knob cap according to an embodiment of the present invention.

Figure 4A:
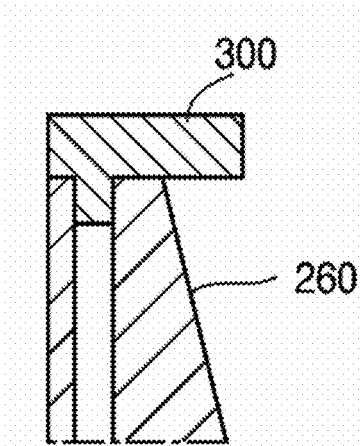
FIG. 4 is a partial cross-sectional view for explaining implementation examples of a thickness conversion portion formed on an outer circumferential surface of the knob cap according to an embodiment of the present invention.

Referring to FIG. 4A, the thickness conversion portion 260 is formed in the form of an inclined surface. In the thickness conversion portion 260, the outer circumferential surface forms the inclined surface and a thickness of the body decreases toward an upper side. Therefore, the inclined surface is located with an upper end close to a center line and a lower end relatively far from the center line. When the thickness conversion portion 260 shown in FIG. 4(a) is formed, at full height on the outer peripheral surface, the body has a trapezoidal cross section with a narrow upper end and a wide lower end.

Figure 4B:
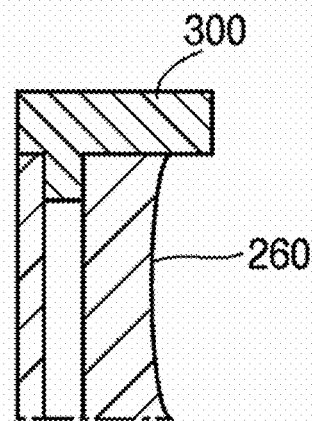
Figure 4C:
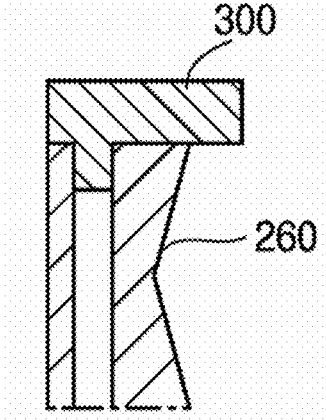

Referring to FIG. 4(b), the thickness conversion portion 260 may be formed in the shape of a curved groove. The curved groove is formed in a concave shape with a middle part toward the center line. Therefore, when the curved groove is formed in the outer circumferential surface, the thickness of the body is the thinnest in the middle part. Referring to of FIG. 4(c), the thickness converting portion 260 may be in the form of a V-shaped groove in which a middle part is concave toward the center line. Therefore, the thickness of the body becomes the thinnest in the middle part. In FIGS. 4(b) and 4(c), the concave portion toward the center line is shown to be formed in the middle part, but its location may be changed. In addition, the inclined surface, the curved groove and the V-shaped groove may be formed over the entire outer circumferential surface of the body in the height direction, but may be formed in a part of the outer circumferential surface of the body. The thickness conversion portion 260 as described above improves a bonding force with the composite material layer 120 to serve to suppress deformation with respect to a stress acting in an outward direction of the liner 110.

According to an embodiment of the present invention, it further includes a reinforcing cap 300 covering the upper surface of the knob cap 200. The reinforcing cap 300 is formed in the form of a hollow thin disk having a larger diameter or width than that of the body 201 of the knob cap 200. The reinforcing cap 300 includes a hollow 310, and a coupling protrusion 320 corresponding to the inner groove 230 is formed on a lower surface thereof. The coupling protrusion 320 is inserted into and coupled to the inner groove 230.

The reinforcing cap 300 is formed of an expanded polypropylene (EPP) foam and has an excellent recovery against repeated impact and deformation, maintains a high dimensional stability when exposed to an extreme temperature, and has an excellent impact resistance, a repeated buffering property, a flexibility and a chemical resistance. This reinforcing cap 300 may increase the ability to respond to a drop test and an external impact of the high-pressure tank 100.

Hereinafter, with reference to Table 1 and FIGS. 5 and 6, a structural stability according to the effect of a weight reduction and stress distribution explanation results of the knob cap according to the present invention are compared.

The embodiment relates to an implementation of the knob cap shown in FIGS. 2 and 3, a reference example is the same as the embodiment, but relates to a form of a straight line in which the thickness conversion portion is not applied to the outer circumferential surface, and a comparative example relates to a conventional knob cap made of a metal material.

In the embodiment and the reference example, an aluminum (specifically, Al6061-T61) material was used for the metal insert, and long fiber thermoplastic was used for the body in which the metal insert was inserted into the coupling groove. Specifically, PA 6 was used as a mattress resin, and 50 wt % of GF was contained.

First, referring to [Table 1], a weight reduction ratio is as follows.

TABLE 1

|  | Embodiment | Reference Example | Comparative Example |
|---|---|---|---|
| material | Al (metal insert) + LFT | Al (metal insert) + LFT | Al |
| resin | PA 6 | PA 6 |  |
| fiber (content) | GF (50 wt %) | GF (50 wt %) |  |
| weight (g) | 312 | 330 | 586 |
| weight reduction ratio (%) | 44.3 | 41.3 | — |

As shown in [Table 1], when the knob cap is formed through insert injection molding of the metal insert and plastic as in the embodiment of the present invention, the effect of the weight reduction equal to or greater than 40% may be obtained compared to the comparative example, which acts as a factor that may increase a weight efficiency of a container product.

Figure 5:
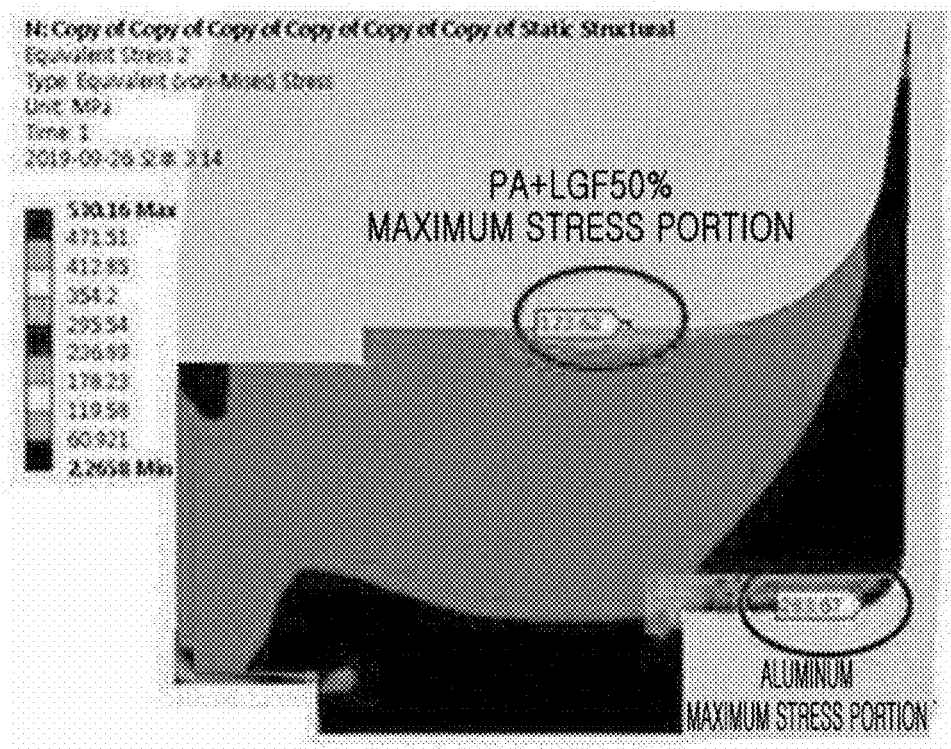
FIG. 5 is a diagram showing a stress distribution analysis result with respect to the knob cap for the high-pressure tank according to an embodiment of the present invention.

FIG. 5 is a diagram showing a stress distribution analysis result with respect to the knob cap for the high-pressure tank according to an embodiment of the present invention. FIG. 6 is a diagram showing a stress distribution analysis result with respect to the knob cap for the high-pressure tank according to a reference example.

It was assumed that a liner was molded by a blow molding method using a PA-based resin. The liner may be molded by rotation molding or injection molding. After forming the liner, the knob caps according to the embodiment and the reference example were attached to a screw-type protrusion, and the composite material layer was formed by a filament winding technique. A stress distribution analysis was performed assuming that gas such as hydrogen was injected at high pressure after complete curing, and whether the knob is deformed at a minimum design bursting pressure (1,750 bar) was analyzed. Damage occurs when a stress value exceeds a tensile strength value of each material (see Al6061-T61: 310 Mpa, PA6+GF50 wt %: 230 Mpa)

Figure 6:
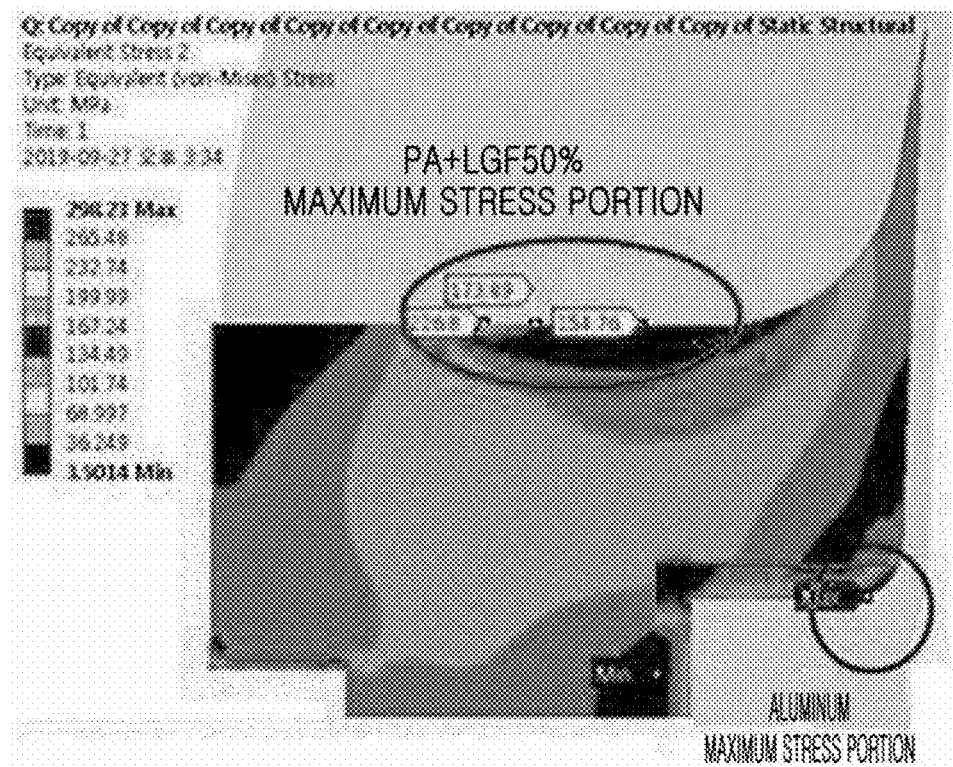
FIG. 6 is a diagram showing a stress distribution analysis result with respect to the knob cap for the high-pressure tank according to a reference example of the present invention.

Upon comparing FIGS. 5 and 6, as shown in FIG. 5, in the embodiment, it may be seen that a safety margin of +85% in a plastic material and +9% in an aluminum material were secured, and a sufficient structural stability was secured in the wing peripheral portion.

As such, it may be seen that, in the case of the embodiment of the present invention, a sufficient structural excellence is exhibited with a weight reduction.

The above description of the present invention is for illustration, and one of ordinary skill in the art to which the present invention pertains may understand that the description may be easily modified into other specific forms without changing the technical spirit or essential features of the present invention. Therefore, it should be understood that the embodiments described above are illustrative in all respects and not restrictive. The scope of the present invention is indicated by the following claims, and all changes or modifications derived from the meaning and scope of the claims and their equivalent concepts should be construed as being included in the scope of the present invention.

EXPLANATION OF REFERENCE NUMERALS

100: high-pressure tank
110: liner
111: knob
120: composite material layer
200: knob cap
201: body
210: coupling groove portion
211: metal insert
220: peripheral wing portion
230: inner groove
240: fixing groove
250: bushing
260: thickness conversion portion
300: reinforcing cap
310: hollow
320: coupling protrusion

The invention claimed is:

1. A knob cap for a high-pressure tank, the knob cap comprising:
a coupling groove portion corresponding to a knob of a liner of the high-pressure tank formed in a lower surface of a body;
a peripheral wing portion extending outward in a lower end of an outer circumferential surface of the body to be in contact with a surface of the liner; and
a thickness conversion portion formed in the outer circumferential surface of the body to change a thickness between a center line and the outer circumferential surface,
wherein the body includes:
a hollow fixing groove formed in a center of an upper surface of the body, and
a plurality of inner grooves surrounding the hollow fixing groove and extending downward from the upper surface of the body.

2. The knob cap of claim 1, wherein:
a metal insert formed of a metal material coupled to the knob is inserted into the coupling groove portion.

3. The knob cap of claim 2, wherein:
the metal insert is in the shape of a cup having a hollow in which a thread is formed on an inner circumferential surface.

4. The knob cap of claim 2, wherein:
the body is formed of fiber-reinforced plastic reinforced with a glass fiber or a carbon fiber, and
the metal material of the metal insert includes aluminum.

5. The knob cap of claim 1, wherein:
a reinforcing cap including a coupling protrusion coupled to the inner groove and having a hollow is coupled to the upper surface of the body.

6. The knob cap of claim 1, wherein:
the thickness conversion portion is in the form of stairs in which a step is formed.

7. The knob cap of claim 1, wherein:
in the thickness conversion portion, the outer circumferential surface is in the form of an inclined surface in which a thickness of the body decreases toward an upper side, or in the form of a curved groove or a V-shaped groove concave toward a center line.

8. The knob cap of claim 1, wherein:
a fixing shaft is able to be coupled to the hollow fixing groove when performing a filament winding process is formed.

9. The knob cap of claim 1, wherein:
the body includes a reinforcing material inserted into the inner groove to prevent deterioration in physical properties of the body.

* * * * *